(12) United States Patent
Ming-Shun

(10) Patent No.: US 6,446,850 B2
(45) Date of Patent: Sep. 10, 2002

(54) LUGGAGE RACK ON CAR ROOF

(75) Inventor: Yang Ming-Shun, Taipei (TW)

(73) Assignee: Formosa Saint Jose, Corp., Taipei (TW)

( * ) Notice: Subject to any disclaimer, the term of this patent is extended or adjusted under 35 U.S.C. 154(b) by 7 days.

(21) Appl. No.: 09/789,658

(22) Filed: Feb. 22, 2001

(30) Foreign Application Priority Data

May 16, 2000 (TW) .......................................... 089208332

(51) Int. Cl.⁷ ............................................... B60B 9/048
(52) U.S. Cl. ....................... 224/324; 224/325; 224/559; 224/917.5
(58) Field of Search ................................ 224/324, 325, 224/559, 917.5

(56) References Cited

U.S. PATENT DOCUMENTS

| | | | | |
|---|---|---|---|---|
| 3,348,747 A | * | 10/1967 | Vuarchex | 224/315 |
| 3,701,436 A | * | 10/1972 | Adams | 114/364 |
| 3,776,437 A | * | 12/1973 | Carney | 211/70.5 |
| 3,836,058 A | * | 9/1974 | Penniman et al. | 211/70.5 |
| 3,897,895 A | * | 8/1975 | Read | 211/70.5 |
| 4,056,220 A | * | 11/1977 | Trimble | 114/364 |
| 4,372,469 A | * | 2/1983 | Kowalski et al. | 224/321 |
| 4,497,425 A | * | 2/1985 | Mobius | 224/319 |
| 6,003,748 A | * | 12/1999 | Rivenbark | 211/70.8 |
| 6,237,983 B1 | * | 5/2001 | Yang | 135/88.1 |
| 6,257,471 B1 | * | 7/2001 | Dixon et al. | 224/319 |

* cited by examiner

Primary Examiner—Stephen P. Garbe
(74) Attorney, Agent, or Firm—Erik M. Arnhem

(57) ABSTRACT

A luggage rack on car roof mainly includes two long supports, a plurality of supporting suckers, and a plurality of ski holders. Each of the upper and the lower side of the long supports is provided with two longitudinally and parallelly extended channels. Each of the ski holders includes a U-shaped base and two bridge-type retainers. The U-shaped base includes two walls defining a space between them for holding a pair of skis. The two walls of the U-shaped base outward extend to provide two side extensions each having a stopper thereon. Each of the two bridge-type retainers straddles one side extension to locate between the stopper and the wall from which the side extension extends. The supporting suckers are movably connected at tops to the lower side of the long supports and attached at bottoms to the car roof through vacuum suction. The ski holders are removably connected to the upper side of the long supports. When the U-shaped bases of the ski holders are removed from the long supports, a plurality of secondary suckers may be attached to the car roof and connected to the lower side of the long supports to locate at two sides of the supporting suckers for the long supports to carry heavy pieces of luggage.

12 Claims, 8 Drawing Sheets

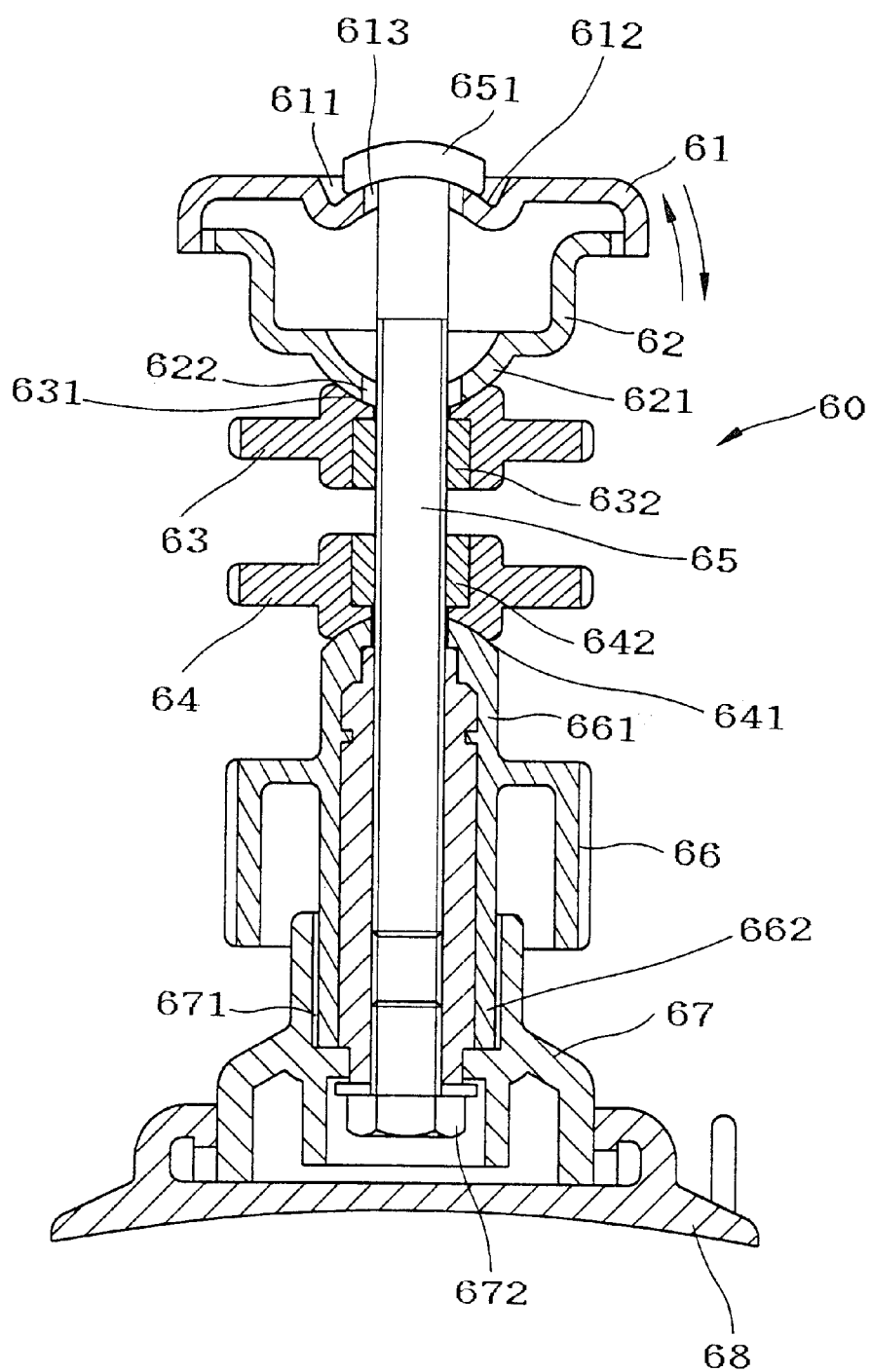
F I G . 9

LUGGAGE RACK ON CAR ROOF

BACKGROUND OF THE INVENTION

It is very common for many people to drive to some vacation-lands to enjoy different outdoor activities in holidays. Items needed and prepared for outdoor activities, such as skis, trunks, etc., usually occupy a large space and the preferably loaded on the car roof. For this purpose, there are developed various kinds of luggage racks for mounting on the car roof to hold such outdoor-activity items. Generally, a luggage rack designed for holding skis is different from that for holding trunks and could not be replaced with the latter. A car owner has to purchase different luggage racks for different purposes. This is, of course, inconvenient for consumers and will increase the consumers' burden.

It is therefore tried by the inventor to develop a luggage rack on car roof capable of carrying both skis and trunks.

SUMMARY OF THE INVENTION

The luggage rack on car roof according to the present invention mainly includes two long supports, a plurality of supporting suckers, and a plurality of ski holders. Each of the upper and the lower side of the long supports is provided with two longitudinally and parallelly extended channels. Each of the ski holders includes a U-shaped base and two bridge-type retainers. The U-shaped base includes two walls defining a space between them for holding a pair of skis. Lower outer ends of the two walls of the U-shaped base outward extend to provide two side extensions each having a stopper thereon. Each of the two bridge-type retainers straddles one side extension to locate between the stopper and the wall from which the side extension extends. The supporting suckers are movably connected to the lower side of the long supports for attaching to the car roof through vacuum suction. The ski holders are removably connected to the upper side of the long supports. When the U-shaped bases of the ski holders are removed from the long supports, a plurality of secondary suckers may be attached to the car roof and connected to the lower side of the long supports to locate at two sides of the supporting suckers for the long supports to carry heavy pieces of luggage. The luggage rack on car roof can therefore be used to hold skis and general luggage as actual need.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 9 is an assembled sectional view of the secondary sucker of FIG. 8.

DETAILED DESCRIPTION OF THE PREFERRED EMBODIMENTS

Figure 1:
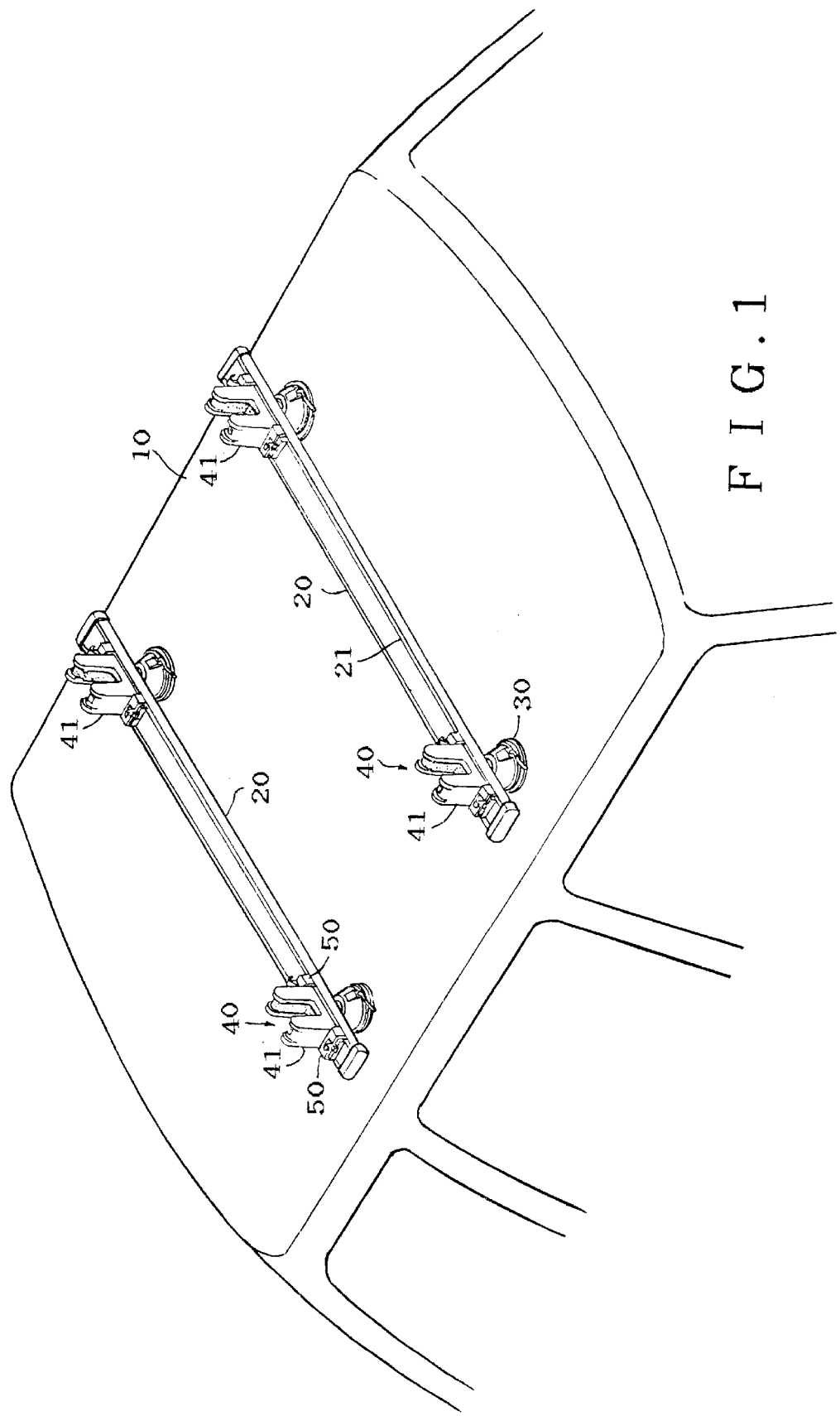
FIG. 1 shows the mounting of a luggage rack of the present invention on a car roof.
Figure 2:
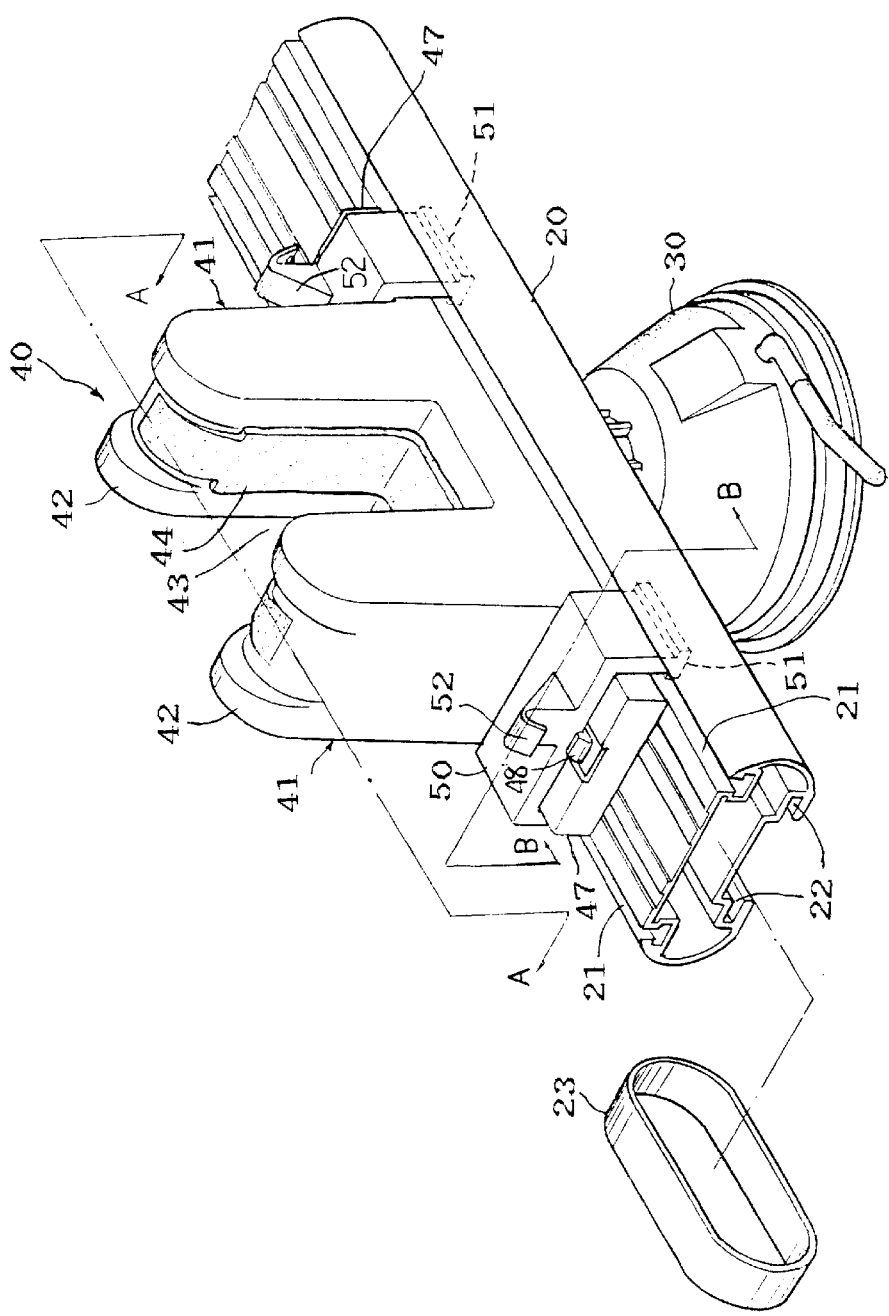
FIG. 2 is a fragmentary, enlarged perspective of the luggage rack of the present invention.
Figure 7:
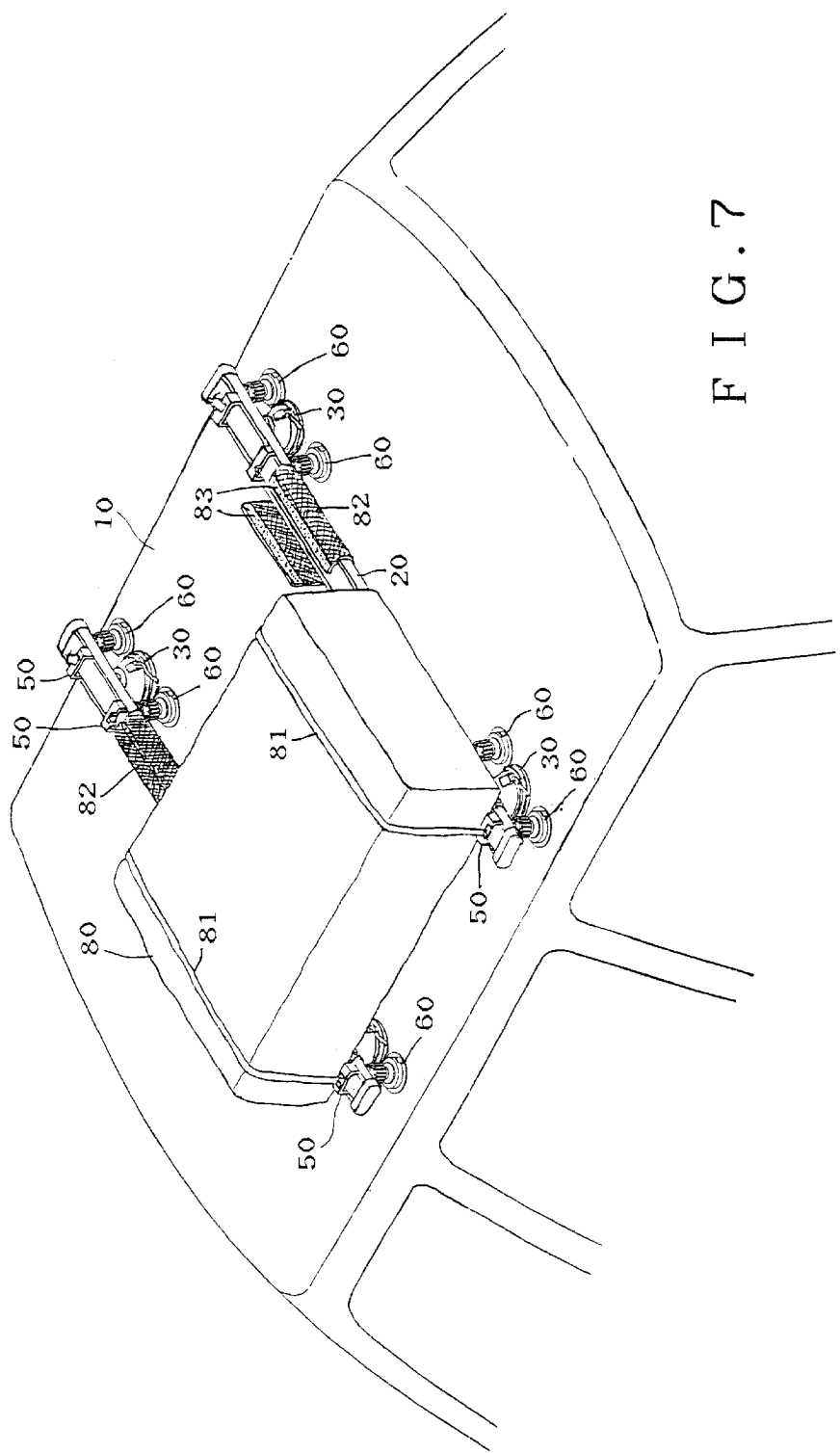
FIG. 7 shows the luggage rack of the present invention is used to hold a trunk on the car roof.

Please refer to FIGS. 1, 2 and 7. The luggage rack on car roof according to the present invention mainly includes two long supports (20), four supporting suckers (30), four ski holders (40), and eight secondary suckers (60) (see FIG. 7).

The two long supports (20) are parallelly and symmetrically mounted on and across the roof (10) through the four supporting suckers (30) that the separately connected to lower outer ends of the long supports (20) and then directly attached to the roof (10) at desired positions through vacuum suction. The four ski holders (40) are separately adjustably connected to an upper side of the two long supports (20) at desired positions, so that ski holders (40) at the same end of the two long supports (20) correspond to each other to hold one or two pairs of skis (70) thereto, as indicated with broken lines in FIG. 4. The eight secondary suckers (60) are separately mounted on the roof (10) through vacuum suction to locate below the two long supports (20) and at two sides of each supporting sucker (30), as can be clearly seen in FIG. 7. When there are heavy pieces of luggage, such as trunks (80), to be held on the two long supports (20), the secondary suckers (60) are useful to help the supporting suckers (30) to support the trunks (80) on the long supports (20) and enable even distribution of loads borne by the long supports (20) over the suckers (30),(60).

Figure 3:
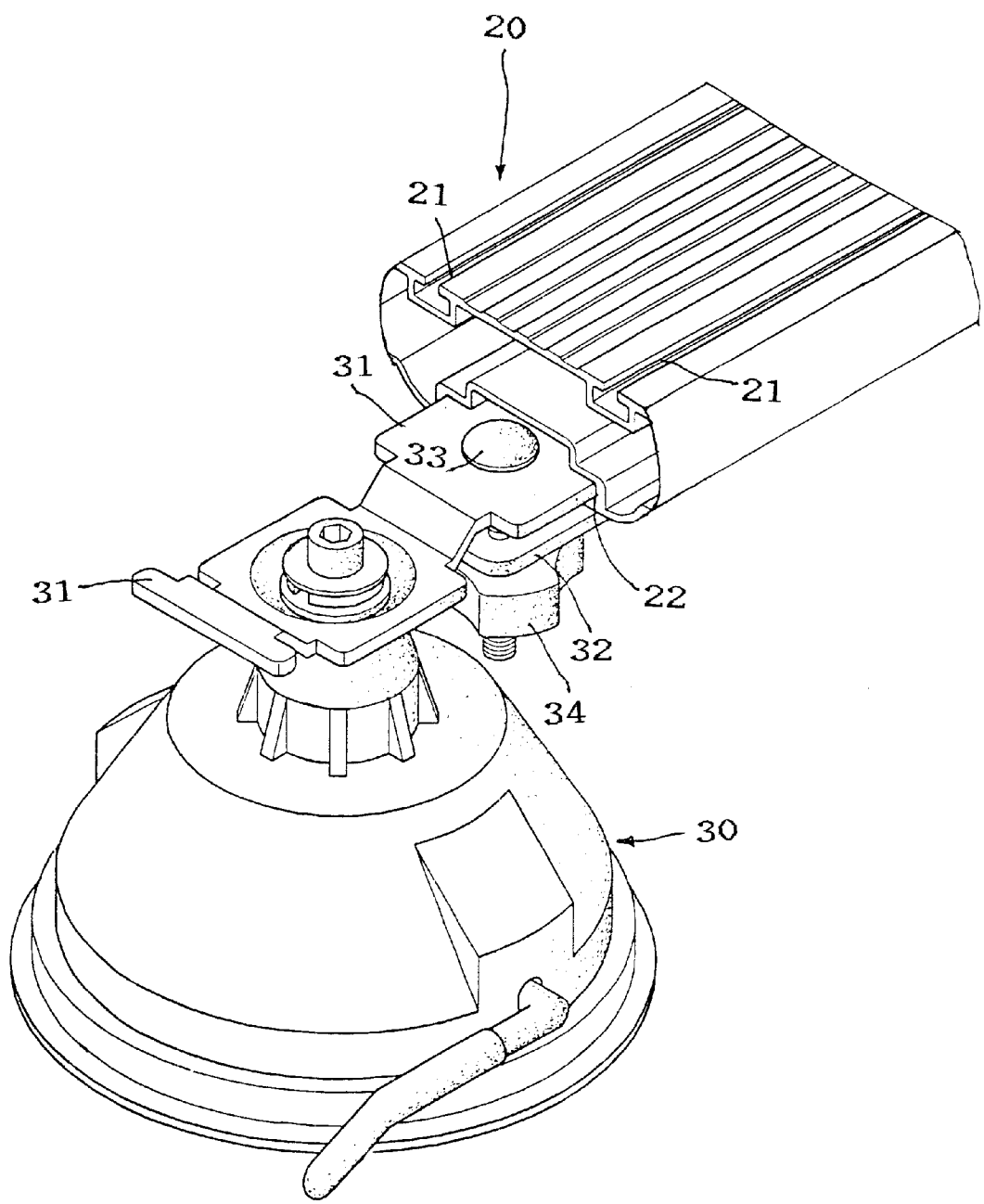
FIG. 3 shows the assembling of a supporting sucker to a long support of the luggage rack of the present invention.

Please refer to FIGS. 2 and 3 at the same time. The long support (20) each is provided near upper outer corners with two lengthwise parallel upper channels (21), and near lower outer corners, with two lengthwise parallel lower channels (22). Each of the ski holders (40) is connected to the upper side of the long support (20) via two bridge-type retainers (50), each of which includes two lower rails (51) that are adapted to slidably engage into the two upper channels (21) to allow the ski holders (40) to adjustable move along the long support (20). Each of the supporting suckers (30) is connected to the lower side of the long support (20) by engaging two extended wing portions (31) at a top of the supporting sucker (30) into the two lower channels (22). Each of the wing portions (31) is then firmly held to the lower side of the long support (20) by downward extending a bolt (33) through a center of the wing portion (31) and a clamping plate (32), that is positioned below the lower side of the long support (20) immediately below the wing portion (31), to engage with a nut (34). Since the supporting sucker (30) is a known product, the structure and the functioning principle thereof is not described herein.

Figure 4:
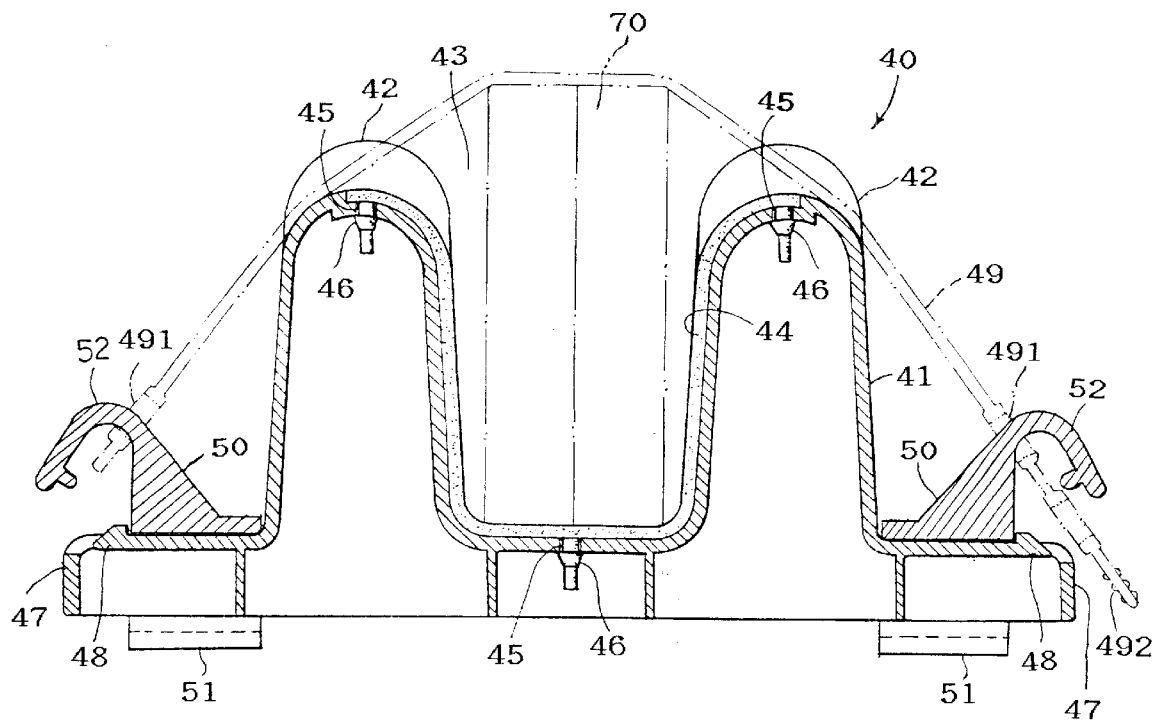
FIG. 4 is a sectional view taken on line A—A of FIG. 2.
Figure 5:
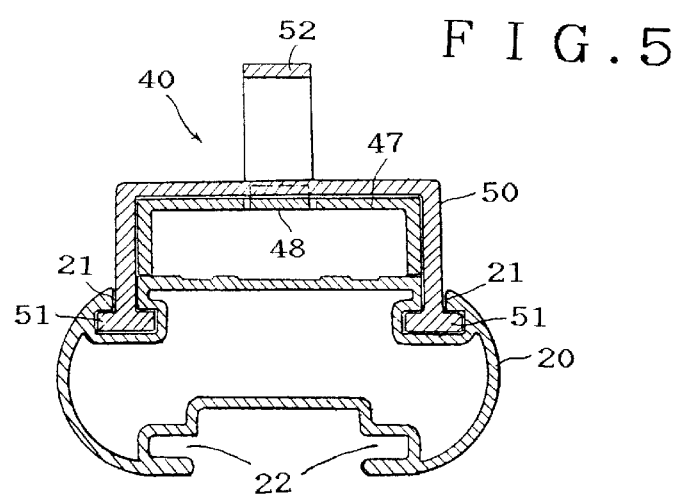
FIG. 5 is a sectional view taken on line B—B of FIG. 2.

Please refer to FIGS. 2, 4 and 5. The ski holder (40) each mainly includes a U-shaped base (41), two bridge-type retainers (50), and a binding strap (49). The U-shaped base (41) includes two spaced walls (42) defining a U-shaped space (43) therebetween. Each of the spaces (43) is dimensioned for at least one pair of skis (70) to extend therethrough. An elastic pad (44) is provided in the space (43) to spread over inner wall surfaces of the two walls (42) to protect the skis (70) supported on the ski holder (40) in the space (43) against damage possibly caused by collision with or impact against the walls (42). As shown in FIG. 4, the elastic pad (44) is connected to the U-shaped base (41) through engagement of stubs with holes. That is, the U-shaped base (41) is provided at predetermined positions with multiple insertion holes (45), and the elastic pad (44) is provided at an underside with multiple barb studs (46)

corresponding to the insertion holes (45). By aligning the barb studs (46) with the insertion holes (45), the elastic pad (44) is fixed onto the U-shaped base (41) without the need of bonding material. Procedures for adhering the elastic pads (44) to the ski holders (40) can therefore be eliminated. The U-shaped base (41) includes two side extensions (47) separately outward extended from lower outer ends of the two walls (42). Each of the side extensions (47) is provided at a predetermined position with a stopper (48).

Each of the bridge-type retainers (50) straddles one of the side extensions (47) of the U-shaped base (41) and is restricted to locate between the wall (42) and the stopper (48). As can be clearly seen from FIG. 5, each of the bridge-type retainers (50) is provided at two side walls with two lower rails (51) adapted to engage into the two upper channels (21) on the long support (20), as mentioned before. That is, the entire U-shaped base (41) is exially movably and removably connected to the long support (20) by engaging the lower rails (51) of the retainer (50) into the upper channels (21) on the long support (20). This design enables the ski holders (40) to be conveniently mounted onto the long supports (20).

As shown in FIGS. 2, 4 and 5, each of the bridge-type retainers (50) is provided at an upper outer edge with an upward extended lug (52) for engaging with a through hole (491) provided at an end of the binding strap (49).

The binding strap (49) is provided at two ends with two through holes (491). When the skis (70) are positioned to straddle two corresponding U-shaped bases (41) of the ski holders (40), the binding strap (49) for each U-shaped base (41) is extended over and across the skis (70) with the through holes (491) at two ends of the binding strap (49) engaged with the lugs (52) of the bridge-type retainers (50) at two sides of the U-shaped base (41), so as to safely confine the skis (70) to the ski holders (40). To facilitate easy applying of force to tension the binding strap (49), antislip patterns (492) are provided on outer surfaces of two ends of the binding strap (49).

Two caps (23) are removably attached to the two ends of each of the long supports (20), so as to close the upper and the lower channels (21), (22) and prevent the bridge-type retainers (50) and the U-shaped bases (41) from separating from the long supports (20) via two bare ends thereof.

Figure 6:
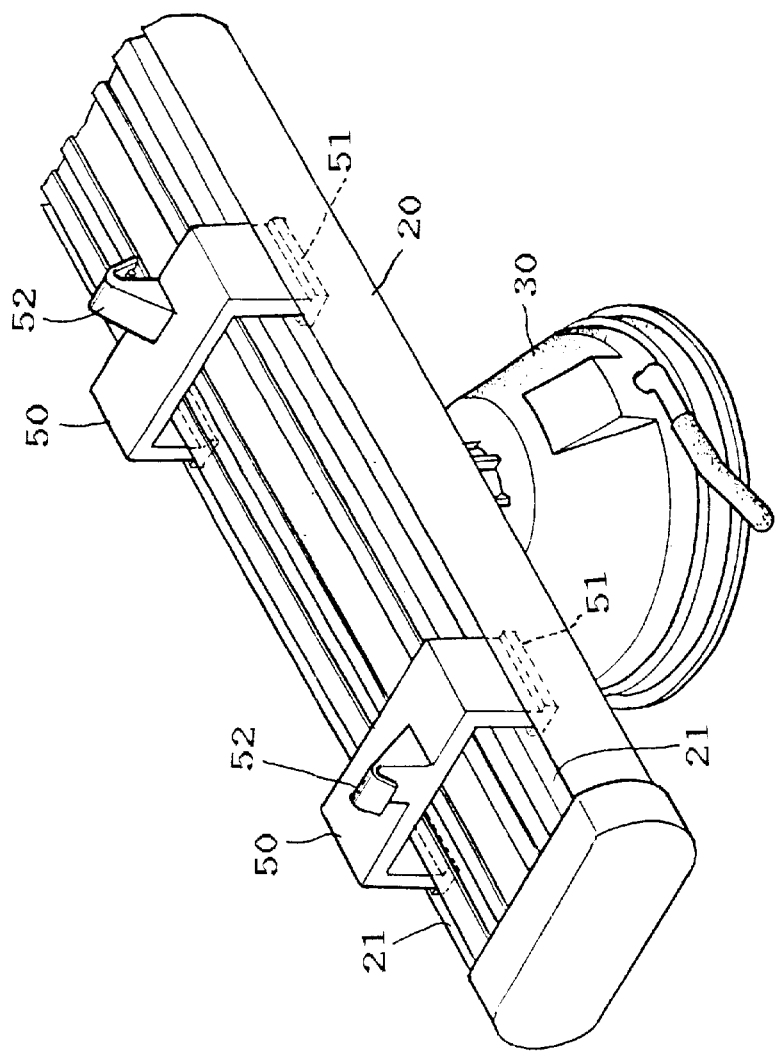
FIG. 6 shows the connection of a bridge-type retainer to the long support of the present invention.

Please now refer to FIGS. 6 and 7. The U-shaped bases (41) of the ski holders (40) may be removed from the long supports (20) with the bridge-type retainers (50) still engaged with the long supports (20). In this case, the eight secondary suckers (60) may be separately mounted on the car roof through vacuum suction to locate below the long supports (20) and at two sides of each supporting sucker (30). The secondary suckers (60) at two sides of the supporting suckers (30) reinforce the supporting suckers (30) when heavy pieces of luggage, such as trunks (80), are loaded on the long supports (20). The secondary suckers (60) also allow even distribution of weight borne by the long supports (20) over suckers (30), (60).

When a trunk (80) straddles the two long supports (20), binding straps (81) may be extended across the trunk (80) with two ends of the straps (81) hooked to the lugs (52) of the bridge-type retainers (50) to firmly hold the trunk (80) to the long supports (20). Moreover, the long supports (20) may be wrapped with antislip pads (82), for example, in the form of net, by attaching a hook tape and a loop tape of a magic tape (83) separately provided at two edges of each pad (82) to each other. Positioning the trunks (80) on the long supports (20) wrapped with the antislip pads (82) not only effectively prevents the trunks (80) from direct frictional contacting with outer surfaces of the long supports (20) to cause any damage of the trunks (80) and the long supports (20), but also prevents the trunks (80) from freely moving on the smooth surfaces of the long supports (20).

Figure 8:
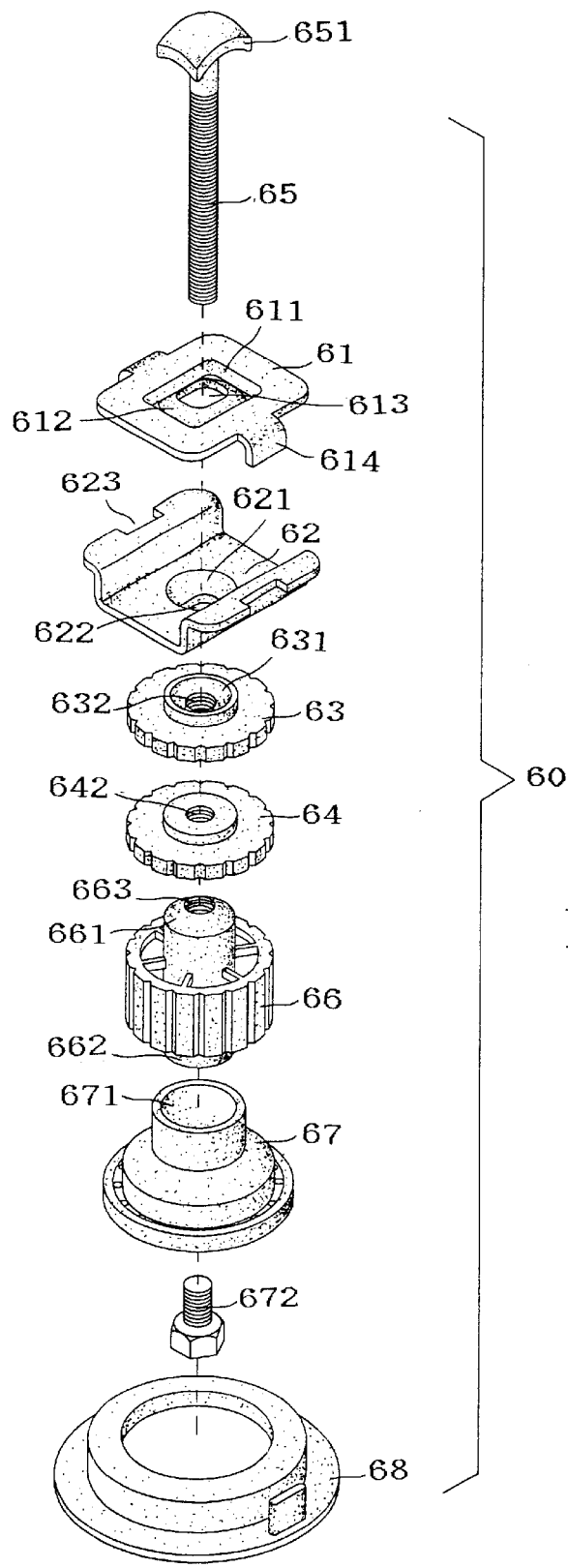
FIG. 8 is an exploded perspective of a secondary sucker of the present invention.

FIGS. 7, 8 and 9 show the secondary suckers (60) of the present invention. Each of the secondary suckers (60) mainly includes an upper fixing plate (61), a lower fixing plate (62), an upper turning disk (63), a lower turning disc (64), an adjusting screw bolt (65), an adjusting knob (66), a seat (67), and a sucker (68).

The upper fixing plate (61) includes a central recess (611) that has an upward curved bottom to provide a first convex head (612). A first rectangular hole (613) is provided at a central area of the first convex head (612) for the adjusting screw bolt (65) to extend therethrough. The lower fixing plate (62) has a downward projected central portion to provide a convex bottom (621). A second rectangular hole (622) is provided at a center of the convex bottom (621) for the adjusting screw bolt (65) to extend therethrough. The upper fixing plate (61) is provided at two opposite sides with two ear portions (614) that are adapted to engage into two notches (623) provided at two opposite sides of the lower fixing plate (62) to bind the upper and the lower fixing plates (61), (62) into one united body. Two opposite sides of the united body of the upper and the lower fixing plates (61), (62) having the ear portions (614) and the notches (623) form two wing portions adapted to engage into the lower channels (22) of the long supports (20).

The upper turning disk (63) has a saucer-like top central area to provided a first concave recess (631) corresponding to the convex bottom (621) of the lower fixing plate (62), so that the convex bottom (621) is freely slidable in the first concave receas (631) to enable free adjustment of the lower fixing plate (62) to a desired angle of inclination. This design enables to secondary suckers (60) to be attached to an inclined area of roof (10) while keeping the lower and the upper fixing plates (62), (61) in a horizontal position. The first concave recess (631) is provided at a center with a first threaded hole (632) for the adjusting screw bolt (65) to screw through. When the upper turning disk (63) is turned, it is able to move up or down along the adjusting screw bolt (65) to tightly press against the convex bottom (621) and accordingly fix the lower fixing plate (62) in place or to release from the lower fixing plate (62), respectively.

The lower turning disk (64) is structurally identical to the upper turning disk (63) but is positioned to face away from the upper turning disk (63). That is, the lower turning disk (64) has a second concave recess (641) provided at a bottom center thereof, and a second threaded hole (642) at the center of the second concave recess (641) for the adjusting screw bolt (65) to screw therethrough. When the lower turning disk (64) is turned, it is able to move up or down along the screw bolt (65) to disengage from the adjusting knob (66) below it or to tightly press against a second convex head (661) of the adjusting knob (66), respectively.

The adjusting screw bolt (65) is provided at a top with a downward curved head (651) that has Shape and curvature corresponding to that of the first convex head (612) in the recess (611) of the upper fixing plate (61) but has a reduced area compared with the first convex head (612). Whereby, when the adjusting screw bolt (65) is extended through the first rectangular hole (613) of the upper fixing plate (61), the curved head (651) of the adjusting screw bolt (65) is allowed to set in the recess (611) and fitly contact with the first convex head (612). Since the curved head (651) has the same curvature as that of the first convex head (612) and is smaller in area than the first convex head (612), it is possible for the first convex head (612) to slide smoothly under and relative to the curved head (651), allowing adjusting of the upper fixing plate (61) and the lower fixing plate (62) to a desired angle of inclination.

The adjusting knob (66) is formed at a top portion (661) with a second convex head corresponding to the second concave recess (641) of the lower turning disk (64). A bottom portion (622) of the adjusting knob (66) is movably set in a central socket (671) of the seat (67). A screw (672) is upward extended through the seat (67) and the socket (671) to screw into a central threaded hole (663) of the adjusting knob (66), so that the adjusting knob (66) is rotatable relative to the seat (67). The adjusting screw bolt (65) also downward extends into the central threaded hole (663) of the adjusting knob (66). Whereby, when the adjusting knob (66) is rotated clockwise or counterclockwise, the adjusting screw bolt (65) is caused to ascend or descend to adjust an overall height of the secondary sucker (60). When a desired overall height of the secondary sucker (60) is achieved, the lower turning disk (64) is turned to downward tightly press against the adjusting knob (66) and lock the latter in place. The sucker (68) is directly connected to a lower side of the seat (67).

With the above arrangements, the luggage rack on car roof according to the present invention is novel and has more than one usage to carry either skis or trunks. The rack is therefore superior to conventional luggage rack for car and is practical for use.

What is claimed is:

1. A luggage rack on car roof, comprising two long supports parallelly and symmetrically positioned on a roof of a car, a plurality of supporting suckers connected to a lower side of said long supports at predetermined positions, and a plurality of ski holders connected to an upper side of said long supports;

each of said long supports being provided at the upper side with two longitudinally and parallelly extended upper channels into which two lower rails of each said ski holder are engaged so that said ski holder is connected to said long support, and at the lower side with two longitudinally and parallelly extended lower channels into which two wing portions at a top of each said supporting sucker are engaged so that said supporting sucker is connected to said long support; and said long supports being fixedly attached to the car roof by attaching said supporting suckers to said car roof through vacuum suction; and each of said ski holders comprising a U-shaped base, two bridge-type retainers, and a binding strap;

said U-shaped base including two opposite walls defining there-between a U-shaped space adapted to support at least a pair of skis therein, and two side extensions separately outward extended from lower outer ends of said two walls and each having a stopper provided at a predetermined position thereon;

each of said bridge-type retainers straddling one said side extension of said U-shaped base and being restricted between said stopper on said side extension and one said wall of said U-shaped base adjacent to said side extension; each of said bridge-type retainers including two opposite side walls each of which has a lower rall formed at a lower end of said side wall, said lower rails being adapted to movably engage into said two upper channels on said long supports; and each of said bridge-type retainers being provided at an upper outer edge with an upward extended lug for engaging with a through hole provided at an end of said binding strap; and said binding strap being provided at two ends with two through holes adapted to engage with said lugs of said bridge-type retainers, said binding strap being extended over and across said skis supported in said U-shaped base of said ski holder with said two through holes at two ends of said binding strap engaged with said lugs of said bridge-type retainers at two sides of said U-shaped base, so as to safely confine said skis to said ski holders;

Whereby said ski holders are freely adjustable in their positions on said long supports and could be removed from said long supports when necessary.

2. A luggage rack on car roof as claimed in claim 1, wherein inner surfaces of said two opposite walls and said U-shaped space of said U-shaped base of each said ski holder is covered with an elastic pad.

3. A luggage rack on car roof as claimed in claim 2, wherein said elastic pad is provided at an underside with a plurality of barb studs adapted to insert into a plurality of insertion holes correspondingly provided on said U-shaped base, whereby said elastic pad is fixedly connected to said U-shaped base by engaging said barb studs into said insertion holes without the need of other bonding material.

4. A luggage rack on car roof as claimed in claim 1, wherein said binding strap is provided at outer surfaces of two ends thereof with antislip patterns.

5. A luggage rack on car roof as claimed in claim 1, wherein each of said long supports is provided at two ends with two caps that removably close two ends of said upper and of said lower channels.

6. A luggage rack on car roof as claimed in claim 1, wherein said long supports are adapted to support trunks or other articles thereon when said U-shaped bases of said ski holders are removed from said long supports, and said trunks or other articles may be firmly bound to said long supports with separate binding straps that are extended across said trunks or said other articles and connected at two ends to said lugs of said two bridge-type retainers that are still mounted on said long supports.

7. A luggage rack on car roof as claimed in claim 1, wherein said long supports are wrapped with antislip pads that are provided at predetermined edges with hook tapes and loop tapes for quickly covering said antislip pads over said long supports.

8. A luggage rack on car roof as claimed in claim 1, further comprises a plurality of secondary suckers, each of which including an upper fixing plate, a lower fixing plate, an upper turning disk, a lower turning disk, an adjusting screw bolt, an adjusting knob, a seat, and a sucker;

said upper fixing plate including a central recess that has an upward curved bottom to provide a first convex head, and a first rectangular hole being provided at a central area of said first convex head for said adjusting screw bolt to extend therethrough;

said lower fixing plate having a downward projected central portion to provide a convex bottom, and a second rectangular hole being provided at a central area of said convex bottom for said adjusting screw bolt to extend therethrough;

said upper turning disk having a saucer-like top central area to provide a first concave recess corresponding to said convex bottom of said lower fixing plate, enabling said convex bottom of said lower fixing plate to freely slide in said first concave recess;

said lower turning disk being structurally identical to said upper turning disk but being positioned to face away from said upper turning disk, that is, said lower turning disk having a second concave recess provided at a bottom center thereof;

said adjusting screw bolt being provided at a top with a downward curved head that has shape and curvature corresponding to that of said first convex head in said recess of said upper fixing plate but has a reduced area compared with said first convex head, whereby when said adjusting screw bolt is extended through said first rectangular hole of said upper fixing plate, said curved head of said adjusting screw bolt is allowed to set in said recess of said upper fixing plate and fitly contact with said first convex head;

said adjusting knob being formed at a top portion with a second convex head corresponding to and adapted to press against said second concave recess at the bottom of said lower turning disk; said seat being provided at a top portion with a central socket into which a lower portion of said adjusting knob is fitly mounted; and said sucker being directly connected to a lower side of said seat;

whereby said secondary suckers are adapted to attach to the car roof through vacuum suction to reinforce said supporting suckers and enable even distribution of weight borne by said long supports over said supporting suckers and said secondary suckers.

9. A luggage rack on car roof as claimed in claim 8, wherein said upper fixing plate is provided at two opposite sides with two ear portions that are adapted to engage into two notches provided at two opposite sides of said lower fixing plate to bind said upper and said lower fixing plates into one united body.

10. A luggage rack on car roof as claimed in claim 8, wherein said upper turning disk is provided at a center of said first concave recess with a first threaded hole into which said adjusting screw bolt is extended; and turning of said upper turning disk about said adjusting screw bolt causing said upper turning disk to move up or down along said adjusting screw bolt to tightly press against said convex bottom of said lower fixing plate to fix said united body of said upper and said lower fixing plates in place or to release from said lower fixing plate, respectively.

11. A luggage rack on car roof as claimed in claim 8, wherein said lower turning disk is provided at a center of said second concave recess with a second threaded hole for said adjusting screw bolt to screw therethrough; and turning of said lower turning disk about said adjusting screw bolt causing said lower turning disk to move up or down along said adjusting screw bolt to disengage from said adjusting knob below said lower turning disk or to tightly press against said second convex head of said adjusting knob to firmly hold the latter to said seat, respectively.

12. A luggage rack on car roof as claimed in claim 8, wherein said adjusting knob is provided with a central threaded hold for said adjusting screw bolt to screw thereinto; and turning of said adjusting knob clockwise or counterclockwise causing said adjusting screw bolt to ascend or descend to change an overall height of said secondary sucker.

* * * * *